SIGNAL OPERATED AUTOMATIC CONTROL CIRCUITS

Filed June 11, 1956 2 Sheets-Sheet 1

INVENTOR.
GORDON F. ROGERS
BY [signature]
ATTORNEY

SIGNAL OPERATED AUTOMATIC CONTROL CIRCUITS

Filed June 11, 1956

2 Sheets-Sheet 2

INVENTOR.
GORDON F. ROGERS
BY
ATTORNEY 2,894,062
Patented July 7, 1959

2,894,062

SIGNAL OPERATED AUTOMATIC CONTROL CIRCUITS

Gordon F. Rogers, Lincolnwood, Ill., assignor to Radio Corporation of America, a corporation of Delaware Application June 11, 1956, Serial No. 590,607

5 Claims. (Cl. 178—5.4)

Figure 1:
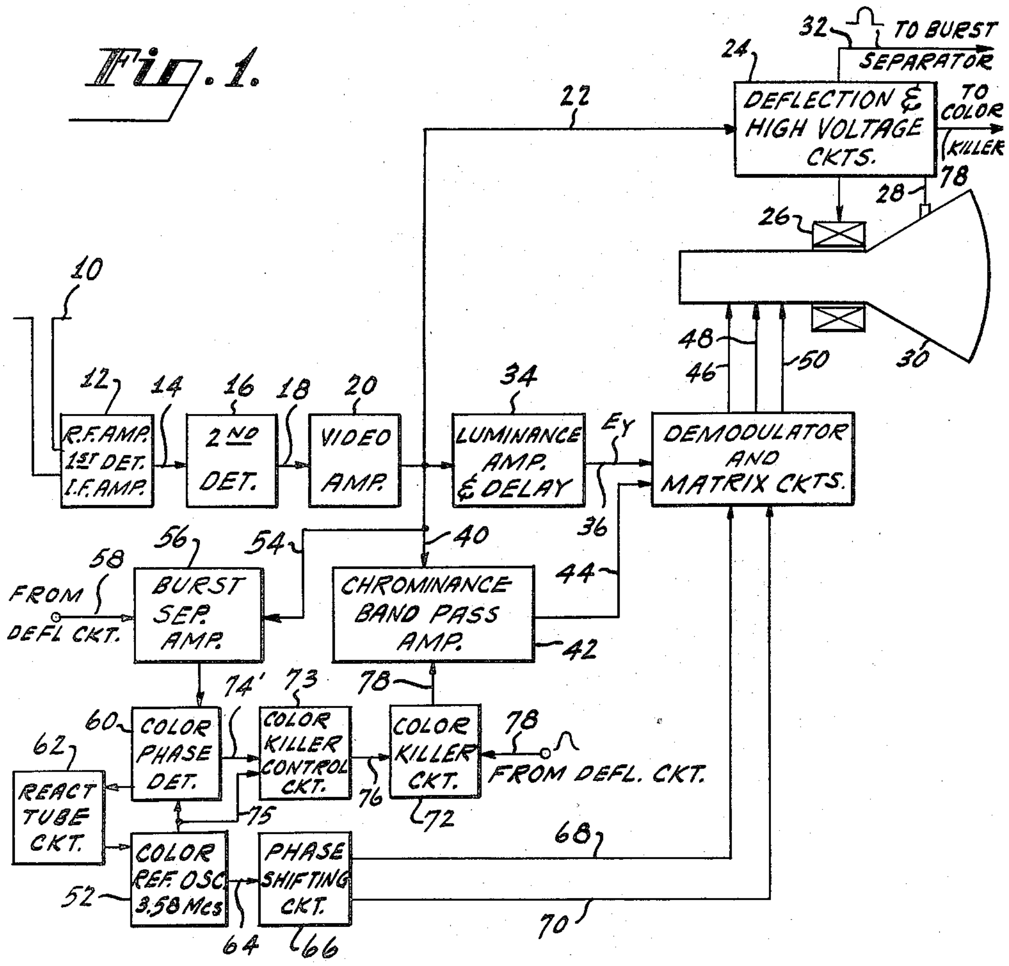

The present invention relates to circuitry for automatically switching between two modes of operation and, more particularly, to new and improved apparatus for automatically disabling the chrominance circuits of a color television receiver upon the reception of black and white television signals.

In accordance with the standards promulgated by the Federal Communications Commission on December 17, 1953, for the transmission and reception of color television information, luminance or brightness information regarding elemental areas of the televised image is transmitted by way of amplitude-modulation of a carrier wave, while information regarding the hue and saturation of the image areas is conveyed by phase- and amplitude-modulation of a color subcarrier wave whose frequency is spaced a fixed amount from the video carrier wave frequency. In order to detect the color information, it is necessary to provide some form of demodulating apparatus, which, according to certain proposed systems, may comprise synchronous demodulating circuits which serve to compare the incoming color subcarrier wave with the output wave of a color reference oscillator, thereby furnishing simultaneously information regarding the phase and amplitude of the received subcarrier wave. In view of the importance of cooperation between transmitter and receiver in such a system, the color reference oscillator must be synchronized with extreme accuracy so that it produces a wave of the same frequency and phase as that developed at the transmitter. Such synchronism is accomplished by the periodic transmission of a "burst" of signal wave equal to the frequency of the color subcarrier wave. A detailed description of the use of bursts for color synchronization may be found in an article entitled, "NTSC Color-TV Synchronizing Signal" which appeared in the February 1952 issue of Electronics, published by McGraw-Hill Publishing Company, Inc. The burst of subcarrier wave frequency is superimposed on the "back porch" of each horizontal blanking pulse.

In order that the receiving apparatus designed for color television image reproduction may also serve to reproduce high quality black and white pictures when receiving ordinary monochrome television signals, the receiver may be arranged in such manner as to arrest or disable the color demodulating circuits when monochrome television signals are being received. Such disabling of the chrominance channels (i.e., the color demodulating channel) of a color receiver during the reception of black and white image signals has been found to be desirable in the prevention of spurious color beat patterns in monochrome reproduction as a result of random demodulation of high frequency picture and noise components appearing in the color channel. As mentioned, the color synchronizing bursts are employed at the receiver in synchronizing the locally produced reference subcarrier wave with the transmitter subcarrier wave. This synchronization may be brought about through the agency of a color AFC circuit for comparing the phase of the sync bursts with the phase of the locally produced wave to derive a correction voltage for controlling the frequency and phase of the oscillator which produces the reference wave at the receiver. It is desirable that synchronization of the receiver's color reference oscillator have been effected before the chrominance channel is activated, in order to prevent the production of spurious color information pending such synchronization.

It is, therefore, an object of the present invention to provide new and improved automatic color channel disabling means.

Another object of the invention is the provision of automatic color channel disabling means, the operation of which is correlated with the action of the receiver color synchronizing circuitry.

In general, the present invention employs, in a novel manner, synchronous phase detector means of the type disclosed in U.S. Patent 2,503,700, granted April 11, 1950, to A. A. Barco. That is, a wave corresponding in phase to the received bursts is applied to the cathode of a triode vacuum tube, while a wave from the color receiver's reference oscillator is applied to the triode anode such that the two waves are in phase when the oscillator is properly synchronized. Through the agency of resistive means in the grid-cathode circuit of the triode, a control voltage is produced which serves to control the receiver's color killer circuit. The action of the color killer circuit is thus correlated with that of the color AFC arrangement of the receiver, so that the chrominance channel is maintained in a disabled condition until the AFC circuit has effectively synchronized the local color reference oscillator with the received subcarrier wave. As will become apparent, the present invention affords the advantage of improved noise immunity, since the color killer control circuit cannot erroneously respond to noise.

Figure 2:
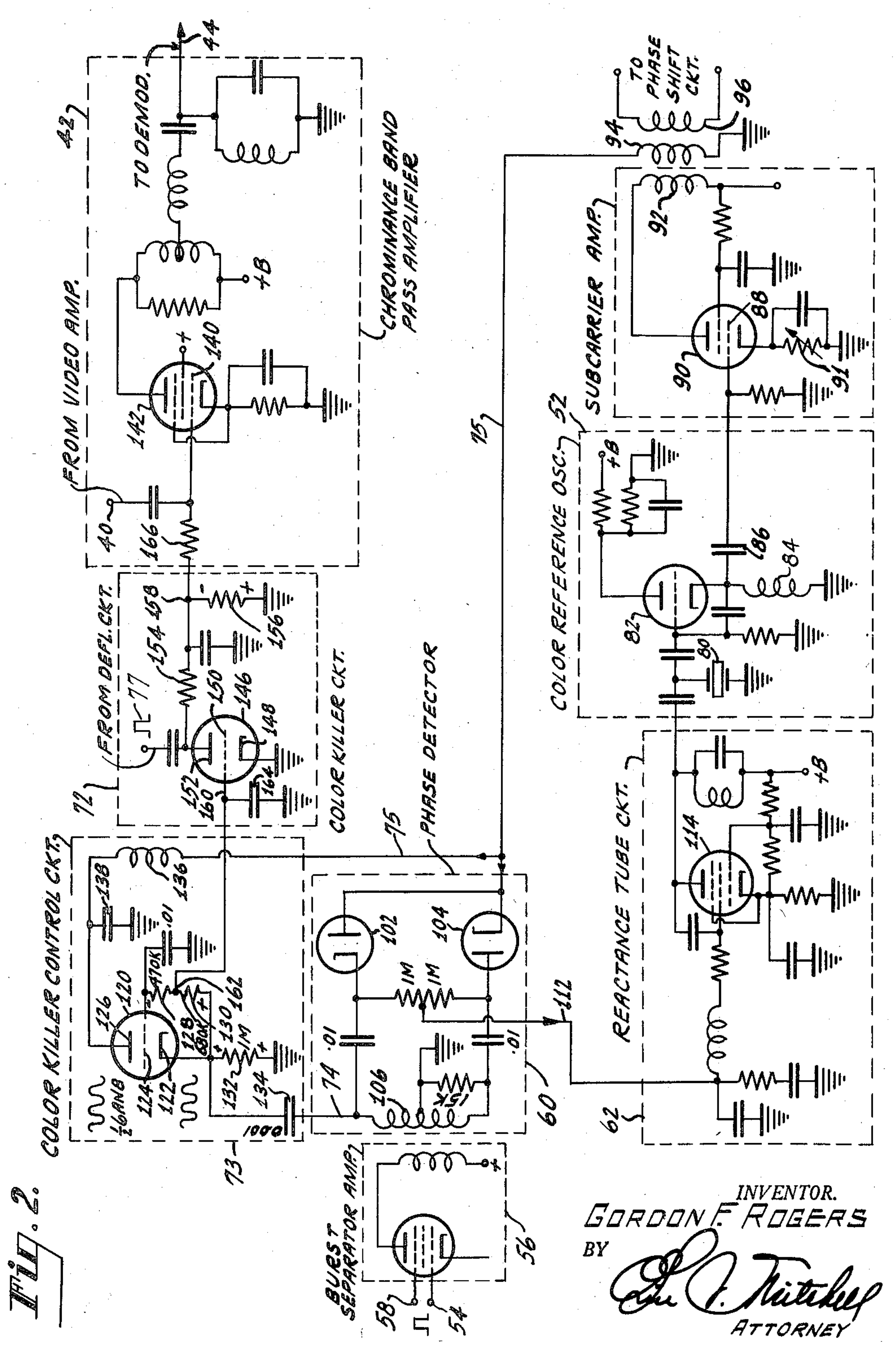

Additional objects and advantages of the present ventnion will become apparent to those skilled in the art from a study of the following detailed description of the accompanying drawing, in which:

Figure 1 illustrates, by way of a block diagram, a color television receiver embodying the present invention; and Figure 2 is a schematic circuit diagram illustrating one form of the invention with certain environmental circuitry.

Referring to the drawing and, particularly, to Figure 1 thereof, there is shown a block diagram of a color television receiver in connection with which the present invention may be employed. An incoming carrier wave, amplitude-modulated by the composite color television signal, including luminance and chrominance components and color sync bursts, is intercepted by an antenna 10 and is applied to a tuner section 12 which includes radio frequency amplification stages, a mixer or first detector wherein the modulated carrier wave is translated in frequency to an intermediate frequency and an intermediate frequency (I.F.) amplifier. The amplified IF signals are applied via a lead 14 to a second or video detector 16 which provides at its output terminal 18 the detected composite color television signal.

The composite signal thus recovered from the video detector 16 is amplified in a broad band video amplifier stage 20 and is applied simultaneously to several channels of the receiver, as follows: The signal is applied via a lead 22 to the deflection and high voltage circuits 24 comprising suitable means for generating scanning sawtooth current waves of television line and field frequencies for application to the electromagnetic deflection yoke 26. In a well-known manner, the flyback voltage pulses produced in the horizontal deflection circuit are rectified to produce a high, unidirectional positive potential for application via a lead 28 to the final anode of the tricolor kinescope 30. Also produced by the deflection circuits 24 and provided at the terminal 32 are burst gating pulses derived from the horizontal flyback pulses and having a duration corresponding substantially to that of the color synchronizing burst referred to above. The gating pulses may be produced, for example, through the agency of a flyback winding on the horizontal deflection output and high voltage transformer forming a part of the horizontal deflection circuit.

The luminance signal component of the composite received televison signal is applied from the video amplifier 20 to a luminance amplifier and delay circuit, represented by the block 34, which provides at its output terminal 36 the luminance signal $E_y$ for application to the demodulator and matrix circuits 38.

The composite color television signal is also applied from the video amplifier via a lead 40 to a chrominance bandpass amplifier 42 which serves to separate the subcarrier wave or chrominance signal information from the composite signal and to amplify the same. The amplified chrominance signal is, in turn, applied via a lead 44 to the demodulator and matrix circuits 38 which may be understood as performing a process of synchronous demodulation upon the chrominance signal to derive therefrom the "color-difference" signals employed in modulating the phase and amplitude of the subcarrier wave at the transmitter. The matrix, specifically, may combine the luminance signal with the color difference signals to provide individual color-representative signals for application via the leads 46, 48 and 50 to the beam intensity-controlling electrodes of the kinescope 30. A detailed discussion of the operation of such circuitry may be found in an article entitled, "Color Television Signal Receiver Demodulators" by D. H. Pritchard and R. N. Rhodes in the June 1953 issue of the RCA Review. The demodulating action requires the provision of subcarrier frequency waves of fixed phase with respect to a reference, which waves may be derived from a color reference oscillator 52 which produces a continuous 3.58 mcs. wave synchronized as to phase and frequency by the color synchronizing bursts accompanying the composite signal. Specifically, the composite signal is applied from the video amplifier 20 via a lead 54 to a burst separator or gating circuit 56, which circuit receives from the terminal 32 of the deflection circuits burst gating pulses which are applied thereto via the terminal 58. The separated color synchronizing bursts are employed in synchronizing the operation of the color reference oscillator 52 through the use of an AFC phase detecting arrangement 60 which provides a D.C. control voltage to a reactance tube circuit 62 connected in circuit with the oscillator 52 for controlling its frequency.

The output wave from the oscillator 52 is applied via a lead 64 to a phase shifting circuit 66 which provides, at its output leads 68 and 70, subcarrier waves of fixed phase with respect to the phase of the reference burst for application to the demodulators and matrix contained within the block 38. Through the process of synchronous demodulation described above, the circuit 38 produces the color difference signals $R-Y$, $G-Y$ and $B-Y$, where R, G and B represent the component color signals and Y represents the luminance signal. The color difference signals may be combined with the luminance signal in the circuitry 38, as shown, or may be applied to different electrodes of the kinescope 30 for combination therein in a known manner. In either event, the intensities of the respective electron beams of the kinescopes are controlled in accordance with the component colors of the image being reproduced.

As thus far described, the apparatus illustrated in Figure 1 is of generally conventional form and need not be described further. For specific circuitry, reference may be made to a book entitled, "Practical Color Television for the Service Industry," Revised Edition, April 1954, Second Edition, First Printng, published by the RCA Service Company, Inc., a Radio Corporation of America subsidiary. It is also to be noted that, as described, the apparatus of Figure 1 is capable of reproducing either color television images or monochrome images, depending upon the presence or absence of a phase- and amplitude-modulated color subcarrier wave in the received signal. As has been stated, color television signals of the standard variety include the color synchronizing bursts, which bursts are absent from a black and white signal. In order that the color signal processing channel including the chrominance amplifier 42 and demodulator circuitry 38 may be operative for the detection of color information during the reception of a color television signal but inoperative when monochrome television signals are being received, the additional apparatus of Figure 1 is provided, in accordance with the present invention. The block 72 bearing the legend "color killer circuit" is controlled by a circuit 73 which receives waves from the oscillator 52 and phase detector 60 via leads 74 and 75 and which provides a control voltage for application to the color killer via a lead 76. The color killer circuit 72 also receives at its input lead 78′ a positive-going flyback pulse 77 from the lead 78 of the deflection and high voltage circuit 24, and serves to render the chrominance channel selectively operable in a manner to be described more fully hereinafter.

In order that the operation of the color killer control circuitry 73 of the present invention may be better understood, specific circuitry of a generally conventional nature for performing the AFC, oscillator, reactance tube and phase-shifting operations of Figure 1 is illustrated schematically in Figure 2. Reference numerals identical to those employed in connection wtih Figure 1 are used in Figure 2 to represent corresponding elements. The color reference oscillator 52 is a conventional crystal oscillator employing a crystal 80 having a resonant frequency equal to that of the subcarrier frequency (i.e., 3.58 mcs.). The output wave produced by the oscillator tube 82, which has in series with its anode-cathode current path a tuned inductance 84, is coupled via a capacitor 86 to the control electrode 88 of a subcarrier amplifier tube 90 which includes a variable cathode resistor 91 to permit adjustment of the amplitude of its output wave. The anode load circuit of the amplifier 90 includes the primary winding 92 of a transformer having first and second secondary windings 94 and 96. The winding 96, by virtue of its coupling with the winding 92, applies a version of the oscillator wave to the phase shifting circuit for providing selected phases of the locally produced color reference subcarrier wave.

The separated and amplified color synchronizing bursts provided by the stage 56 are applied via the transformer "T" to the color AFC phase detector shown within the dotted line rectangle 60. The phase detector 60 comprises the serially connected diodes 102 and 104 which receive, via the center-tapped secondary winding 106 of the transformer "T," opposite phases of the separated burst information. A version of the selected phase of the subcarrier wave present in the winding 94 of the phase shifting circuit is applied via the lead 75 to the junction of the diodes 102 and 104.

In the operation of the phase detector circuit, there is provided at its output lead 112 a direct current voltage whose polarity and amplitude are, respectively, indicative of the direction and amount by which the phase of the color reference oscillator wave (as indicated by the wave at the lead 75) varies from 90° with respect to that of the color synchronizing burst phase. That is, the phase detector provides zero output when the two waves are 90° displaced at the detector. This direct current control voltage is applied to the control electrode of the tube 114 of the reactance tube circuit 62. The reactance tube circuit is of conventional form and furnishes a reactive impedance in circuit with the oscillator crystal 80 for controlling the resonant frequency of the oscillator circuit in a known manner. It will thus be understood that, through the agency of the phase detector 60 and the reactance tube circuit 62, the phase and frequency of the wave produced by the color reference oscillator 52 are accurately controlled.

With the foregoing in mind, the circuitry and operation of a specific form of color killer circuit and color killer control circuit in accordance with the present invention will now be described. The details of the color killer control circuit are shown within the dotted line rectangle 73 in Figure 2. As shown, the color killer control circuit is of the type disclosed in the above-cited Barco patent and includes a triode 120 having a cathode 122, control electrode 124 and anode 126. The control electrode 124 is connected to the cathode 122 of the triode via resistive means comprising the series combination of resistors 128 and 130, while the cathode 122 is connected to a point of fixed potential (ground) via a resistor 132. A wave from the transformer T corresponding to the received burst at the output of the burst separator amplifier 56 is applied via the lead 74 and a coupling capacitor 134 to the cathode 122 of the triode phase detector. The lead 75 from the oscillator output amplifier also applies a version of the subcarrier wave produced by the oscillator 52 to the anode 126 of the triode phase detector. Since, as has been stated, the AFC phase detector 60 is so arranged as to provide zero output when its two input waves are 90° out of phase with respect to each other, the wave at the lead 75 will be understood as leading the burst wave at the lead 74. Thus, there is interposed between the lead 75 and the anode 126 a phase shifting circuit comprising a series inductance 136 and shunt capacitor 138, which circuit serves to shift the phase of the oscillator output wave by 90°. By virtue of the phase shift introduced by the components 136 and 138, it will be understood that the wave applied to the anode 126 of the triode phase detector is normally in phase with the wave applied to its cathode 122 (i.e., when the color reference oscillator 52 is operating in proper synchronism with the incoming bursts).

Since the operation of the triode phase detector is described in detail in the cited Barco patent, its basic operation need not be repeated here. Briefly, however, it may be noted that the control electrode 124 and cathode 122 act as a diode to produce a direct current potential across the resistors 128 and 130 as indicated by plus (+) and minus (−) signs on the drawing, leaving a negative potential on the control electrode 124 with respect to the cathode 122. The anode 126 and cathode 122 act as a second diode to produce another voltage drop across the cathode resistor 132, such that the cathode is positive with respect to ground. The effect, as pointed out in the Barco patent, is similar to the action of two separate diodes, each connected as a peak detector.

In the operation of the phase detector color killer control circuit, it will be understood that the voltage at the control electrode 124 is the algebraic sum of the voltages across the resistors 132, 130 and 128 and, further, that these voltages depend upon the division of electrons from the cathode between the control electrode 124 and anode 126. It will additionally be understood that, when there is no signal present on the anode or when the signal on the anode is passing through zero, and the cathode potential is lowered (as by a negative-going half cycle of the burst wave applied thereto), the division of current between the control electrode and anode circuits will be generally equal, assuming that both "diode" portions of the triode are of generally the same rectifying efficiency. When, on the other hand, the anode is made more negative, the control electrode will receive a greater portion of the cathode electrons. Conversely, when the cathode is made more positive, the anode will receive more of the electrons than the control electrode.

With this background, it will be noted that, when the color reference oscillator 52 is operating in proper synchronism with received bursts during the reception of a color television signal, such that the waves applied to the anode and cathode of the triode 120 are in phase, the anode potential will be swinging in the negative direction when the cathode potential is swinging negatively, so that most of the cathode electrons will remain in the control electrode circuit, with very few reaching the anode 126. Thus, the voltage at the control electrode will be a negative voltage. If, on the other hand, the oscillator is not operating in synchronism with the received bursts, so that the waves on the anode and cathode are out of phase, a different action will occur in the triode as follows: In the extreme case, with the two waves 180° out of phase, the voltage on the anode 126 will be at its maximum positive value at the time that the cathode 122 swings negative with the negative-going half cycle of the burst wave, so that more of the electrons will reach the anode 126 than the number remaining in the control electrode circuit. The result is that the voltage drop across the cathode resistor 132 will increase while the voltage drop across the resistors 128 and 130 decrease, so that the net voltage at the control electrode 124 is a more positive voltage. For other degrees of misphase between the burst wave and oscillator wave applied to the cathode and anode of the triode 120, the voltage at the control electrode 124 will be somewhat less positive than the maximum positive value which obtains for the 180° case. Finally, when no bursts are present on the cathode 122, as during the reception of a monochrome television signal lacking bursts, the triode 120 is almost non-conductive, so that the voltage at its control electrode is substantially at ground potential.

It will, therefore, be appreciated from the foregoing that the triode phase detector 120 serves to produce in its control electrode circuit a direct current voltage which is of negative polarity when the oscillator is operating in proper synchronism with received bursts and which is of a more positive polarity when no bursts are present in the received signal or when the oscillator is not properly synchronized with the bursts. Thus, the present invention employs the voltage at the control electrode of the triode phase detector in controlling the operation of the color killer circuit 72 which circuit, in turn, controls the chrominance channel by way of biasing the chrominance bandpass amplifier 42.

Since the chrominance bandpass amplifier is of generally conventional circuit configuration, it need not be described in detail. It is sufficient to note that, when the voltage applied to the control electrode 140 of the amplifier tube 142 is sufficiently negative, the amplifier tube 142 will be cut off, thereby disabling the chrominance channel. When, on the other hand, the voltage applied to the control electrode 140 is less negative than the predetermined value, normal amplification in the tube 142 will take place for normal color television signal processing.

The color killer circuit 72 illustrated in detail in Figure 2 is also of conventional form and comprises generally a triode 146 having a cathode 148, control eelctrode 150 and anode 152. The cathode 148 is connected to ground reference potential, as shown, while the anode is returned to ground potential through series resistors 154 and 156. Thus, since there is no source of positive operating potential for the anode 152, the triode 146 is normally nonconductive, so that the voltage at the output terminal 158 remains at ground potential. The anode 152 is, however, periodically pulsed with positive-going flyback pulses 77 from the lead 32 which may be connected to a suitable point on the horizontal deflection output transformer of the deflection circuits 24. The pulses 77 will, therefore, be understood as occurring at the line repetition rate of the television system. During the occurrence of each such positive pulse 77, the triode 146 tends to become conductive and the amount of such conduction depends, in turn, upon the voltage applied to its control electrode 150.

In accordance with the present invention, the control electrode 150 is connected via a lead 160 to a point on the resistive control electrode circuit of the phase detector triode 120 so that conduction of the color killer tube is determined by the voltage at the terminal 162.

In the operation of the color killer circuit and the control circuit 73 associated therewith and assuming that a color television signal is being received and that the color reference oscillator 52 is properly synchronized with respect to the incoming bursts, the voltage at the terminal 130 will be a negative voltage which, filtered by the capacitor 164, is sufficiently negative to maintain the color killer triode non-conductive during the application of the pulses 77 to its anode. Thus, the control voltage at the terminal 158 is sufficiently positive for proper operation of the chrominance amplifier tube 142. If desired, the grid resistor 166 through which the control voltage is applied to the electrode 140 of the amplifier may be additionally connected to an adjustable bias source such that the combination of the color killer voltage at the terminal 158 and the additional bias is of the proper value for normal operation of the amplifier tube 142.

When, on the other hand, the signal received is a monochrome broadcast signal, the voltage at the terminal 162 in the color killer control circuit is a more positive voltage, such that the triode 146 is placed in condition for conduction during the application of the positive pulses 77 to its anode. Such conduction of the color killer triode produces a voltage drop across the resistor 166 of such polarity as to produce a negative voltage at the terminal 158, which negative voltage serves to cut off anode-cathode conduction of the chrominance amplifier tube 142, thereby disabling the chrominance channel of the receiver.

If, during the reception of a color television signal, the color reference oscillator should be out of synchronism with respect to the incoming bursts, the voltage at the terminal 130 will again be a more positive voltage, as explained above, so that the color killer tube 146 is permitted to conduct to produce the chrominance amplifier cut-off voltage at its output terminal 158. The chrominance channel will, therefore, remain disabled until such time as the oscillator output wave is properly synchronized as to phase and frequency with respect to the synchronizing bursts of the color television signal.

While resistors 128 and 130 of the values shown in the drawing are illustrated herein, it will be understood that the function of these resistors is that of tapping down the direct current control voltage from the control electrode of the triode 120 in order to make the voltage at the terminal 162 substantially equal to that developed across the cathode resistor 132. In this manner, the output voltage at the terminal 162 during out-of-synchronizing condition of the color reference oscillator is balanced to zero. It is to be noted, that alternatively, the terminal 162 may be connected directly to the control electrode 124 with a suitable change in the value of the cathode resistor 132.

Although the invention has been described herein in accordance with a specific form in which the triode phase detector is supplied with in-phase waves during proper operation of the color reference oscillator, it will be recognized that the invention may also be employed with out-of-phase waves applied to the anode and cathode of the triode 120, with suitable modification of the color killer circuit to accommodate the reversed polarity of the control voltage supplied to it by the triode phase detector.

Having thus described my invention, what I claim as new and desire to secure by Letters Patent is:

1. In a color television receiver of the type adapted to operate upon either a color television signal which includes periodic synchronizing bursts of color subcarrier energy or a monochrome television signal lacking such bursts, the combination comprising: phase detector means comprising an electron tube having a cathode, a control electrode and an anode; a first source of wave corresponding to received bursts; a second source of wave to be synchronized with such bursts; means for applying a wave from one of said sources to said cathode; means for applying a wave from the other of said sources to said anode; circuit means connected to said control electrode for producing a control signal voltage indicative of the phase relation between the wave from said second source and a wave from said first source; a chrominance amplifier in said receiver adapted to process color television signals; and means responsive to said control voltage and connected to said channel to disable said channel in the absence of bursts from a received signal or when the waves from said first and second sources bear other than a predetermined phase relationship to each other.

2. In a color television receiver of the type adapted to operate upon either a color television signal having periodic bursts of color subcarrier energy or a monochrome television signal lacking such bursts, said receiver including means for deriving bursts from a received signal, wave generating means for producing a wave of color subcarrier frequency and means for controlling the operation of such wave generating means in response to received bursts, color killer apparatus comprising: phase detector means comprising an electron tube having a cathode, a control electrode and an anode; means for applying to said cathode and anode waves from said burst deriving means and from said wave generating means in such manner that the waves applied to said cathode and anode are normally in phase; circuit means connected to said control electrode for producing a control voltage which varies from a predetermined normal value in response to a phase difference between the waves applied to said cathode and anode; a chorminance signal processing channel in said receiver; and means responsive to said control voltage and coupled to said channel for inactivating said channel except during the condition in which waves which are substantially in phase with respect to each other are applied to said cathode and anode.

3. In a color television receiver of the type adapted to operate upon either a color television signal having periodic bursts of color subcarrier energy or a monochrome television signal lacking such bursts, said receiver including a chrominance signal processing channel and a color killer circuit operatively connected to such channel for disabling it during the reception of monochrome television signals, color killer circuit control apparatus comprising: phase detector means comprising an electron tube having a cathode, a control electrode and an anode; a source of wave corresponding to received bursts; a source of wave of color sub-carrier frequency nominally having a predetermined phase relation to such bursts; means for applying waves from said sources respectively to said cathode and anode such that the applied waves are normally in phase; circuit means operatively connected to said control electrode for producing a control voltage dependent upon the phase relation of the applied waves; and means for applying such control voltage to said color killer circuit in such manner as to cause said color killer circuit to disable said chrominance channel except during the condition in which in-phase waves are applied to said cathode and anode.

4. In a color television receiver adapted to receive either a color television signal having luminance and chrominance components and recurrent color subcarrier synchronizing bursts or a monochrome television signal lacking said bursts, said receiver including signal processing means adapted to be controlled between a first condition for reproducing color television pictures and a second condition for reproducing monochrome pictures, and further including means providing a source of signals corresponding to said received bursts; means providing a source of continuous subcarrier frequency signals coupled to said signal processing means for causing said signal processing means to demodulate the chrominance components of a received color television signal; phase detector means comprising an electron tube having a cathode, a control electrode and an anode; means for applying signals from one of said sources to said cathode; means for applying signals from the other of said sources to said anode; circuit means connected to said control electrode for producing a control signal indicative of the relationship between the signals from said sources; and means for applying said control voltage to said signal processing means to establish said first condition of operation when said color subcarrier synchronizing bursts are present and in synchronous relation with said continuous subcarrier frequency wave and to establish said second condition of operation when signals occurring during the interval of said color subcarrier synchronizing burst are nonsynchronous with said subcarrier frequency wave.

5. In a color television receiver adapted to receive either a color television signal having luminance and chrominance components and recurrent color subcarrier synchronizing bursts or a monochrome television signal lacking said bursts, said receiver including signal processing means adapted to be controlled between a first condition for reproducing color television pictures and a second condition for reproducing monochrome pictures; means for producing a continuous subcarrier frequency wave coupled to said signal processing means for causing said signal processing means to demodulate the chrominance components of a received color television signal; phase detector means comprising an electron tube having a cathode, a control electrode and an anode; means for applying said color subcarrier synchronizing bursts to said cathode; means for applying said continuous subcarrier frequency wave to said anode; circuit means connected to said control electrode for producing a control signal indicative of the phase relation between said bursts and said wave; and means for applying said control voltage to said signal processing means to establish said first condition of operation when said color subcarrier synchronizing bursts are present and in synchronous relation with said continuous subcarrier frequency wave and to establish said second condition of operation when signals occurring during the interval of said color subcarrier synchronizing burst are nonsynchronous with said subcarrier frequency wave.

References Cited in the file of this patent

UNITED STATES PATENTS 2,744,155 Kihn ------------------- May 1, 1956

OTHER REFERENCES

Color TV, Rider Pub., March 1954, pages 141, 142.

RCA Color Television Receiver, Model CT-100, March 1954, pages 32 to 36.